United States Patent [19]

Diepart et al.

[11] 3,749,940

[45] July 31, 1973

[54] KEYBOARD STROBE FILTER FOR STATIC KEYBOARDS

[75] Inventors: Paul Diepart, Marcinelle; Philippe Gransart, Braine L'Alleud; Gerard Maitrias, Bruxelles, all of Belgium

[73] Assignee: Burroughs Corporation, Detroit, Mich.

[22] Filed: Apr. 21, 1972

[21] Appl. No.: 246,338

[52] U.S. Cl. ............ 307/247 A, 307/218, 307/269, 308/63

[51] Int. Cl. ........................................ H03k 17/00

[58] Field of Search................ 307/247 A, 247, 218, 307/269; 328/63, 165

[56] References Cited

UNITED STATES PATENTS 3,471,789 10/1969 Nutting et al.................. 307/247 A 3,508,079 4/1970 Moll et al. ...................... 307/247 A

*Primary Examiner*—John W. Huckert

*Assistant Examiner*—B. P. Davis

*Attorney*—Paul W. Fish, Leonard C. Suchyta et al.

[57] ABSTRACT

A keyboard strobe system for a static keyboard which strobes the generated code only once for a single key depression whatever the number of contact bounces or overshoots affecting a static strobe signal. The strobe pulse for each contact closure is clock-synchronized. The system comprises a digital signal processing circuit having two retriggerable delay multivibrators, two J-K flip-flops and a plurality of logic gates.

4 Claims, 4 Drawing Figures

KEYBOARD STROBE FILTER FOR STATIC KEYBOARDS

FIELD OF THE INVENTION

This invention relates to keyboard units and more particularly, to a keyboard strobe filter for static keyboards which eliminates the effect of contact bounce and overshoots.

DESCRIPTION OF THE PRIOR ART

In the prior art, there has been disclosed a plurality of logic devices to achieve the benefits of antibounce and single sensing. Such circuits usually comprise a plurality of flip-flops associated with one or more single shots or delay multivibrators.

Only a few of these known circuits synchronized the output pulses thereof with clock pulses and when such synchronizing was provided, it required a manual switch contact arrangement of large complexity.

Examples of this art may be found in U.S. Pat. Nos. 3,471,789 to Bruce W. Nutting et al. and No. 3,508,079 to Edward W. Moll et al., both assigned to the present assignee.

A further example may be found in an article entitled "Contact bounce integrator" by F.G. Petersen in the IBM Technical Disclosure Bulletin, Vol. 13, No. 8, January 1971.

SUMMARY OF THE INVENTION

The present invention is directed to a simple digital signal processing circuit for generating a single clock-synchronized strobe pulse for each contact closure in a static keyboard, by eliminating the effects of contact bounce.

The circuit comprises two retriggerable delay multivibrators to which is applied the keyboard strobe signal and the outputs of which are fed to an OR gate. The output of said OR gate is then coupled to a four machine state loop which is coded by two JK flip-flops which generates one strobe pulse and cycles back to idle when the last contact bounce due to a key depression has disappeared.

BRIEF DESCRIPTION OF THE DRAWINGS

For a better understanding of the invention reference should be made to the accompanying drawings, wherein.

DETAILED DESCRIPTION

Figure 1:
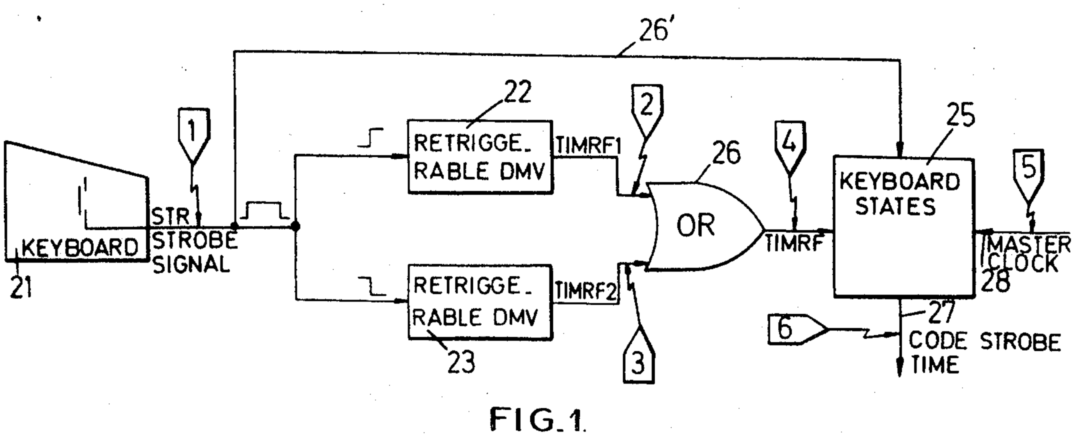
FIG. 1 is a block diagram of the keyboard strobe system.

Referring first to FIG. 1 which is a block diagram of the system for strobing the code generated by a static keyboard, the keyboard strobe signal STR from the keyboard 21 is applied to two retriggerable multivibrators (DMV) 22 and 23. STR signal is applied to the positive transition sensitive input of DMV 22 and to the negative transition sensitive input of DMV 23. The period of both DMV 22 and 23 is so adjusted as to cover the minimum acceptable STR signal duration.

The output signals TIMRF1 and TIMRF2 from DMV 22 and DMV 23 respectively, are coupled to an OR gate 26 to deliver an output signal TIMRF. Said TIMRF signal is true when noise or overshoots are present on the STR signal.

Figure 2:
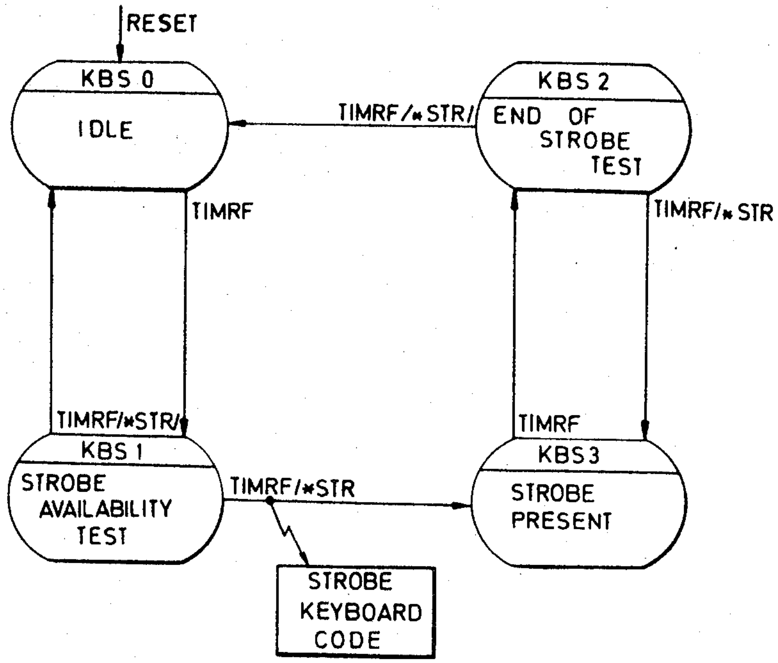
FIG. 2 is a flow chart of the keyboard states.

The output signal TIMRF from OR gate 26 is fed to a four machine state loop 25 which is coded by two flip-flops and which will be further described below with reference to FIGS. 2 to 4. Said machine state loop 25 is synchronized by the master clock signal on line 28. To said loop 25 is also applied directly the STR signal on a line 26'.

When the last contact bounce due to one key depression has subsided, said four machine state loop 25 cycles back to idle.

The operation of the four machine state loop 25 will now be described with more details by reference to the flow chart of FIG. 3.

The keyboard state loop 25 is idle in KBSO. The leading edge of the STR signal triggers DMV 22 which produces the TIMRF1 signal. Should a STR signal trailing edge occur before the fall of TIMRF1, DMV 23 is triggered by such trailing edge to produce TIMRF2 and consequently the output signal TIMRF of OR gate 26 is true until both TIMRF1 and TIMRF2 are false.

Then if STR is false when TIMRF goes false, this means that STR was a noise and in loop 25, KBS1 changes back to KBSO, the idle condition.

To the contrary when STR is true as TIMRF goes false, this means that STR is actually a strobe signal and equation KBS1 * TIMRF/ * STR strobes the keyboard code to the desired buffer. Then KBS1 exits to KBS3. The logic remains in KBS3 until a trailing edge of STR signal triggers DMV 23 to generate TIMRF2. This causes KBS3 to exit to KBS2, which means testing the end of strobe.

KBS2 tests whether the STR trailing edge is due to the end of the keyboard depression or to a noise on the strobe signal. If STR is true as TIMRF falls, this means that the keyboard depression has not ended and KBS2 returns to KBS3 to await the actual end of keyboard depression.

To the contrary if STR is false as TIMRF falls, this means the actual end of keyboard depression and KBS2 returns to KBSO. The loop 25 is then ready for a following operation.

Figure 4:
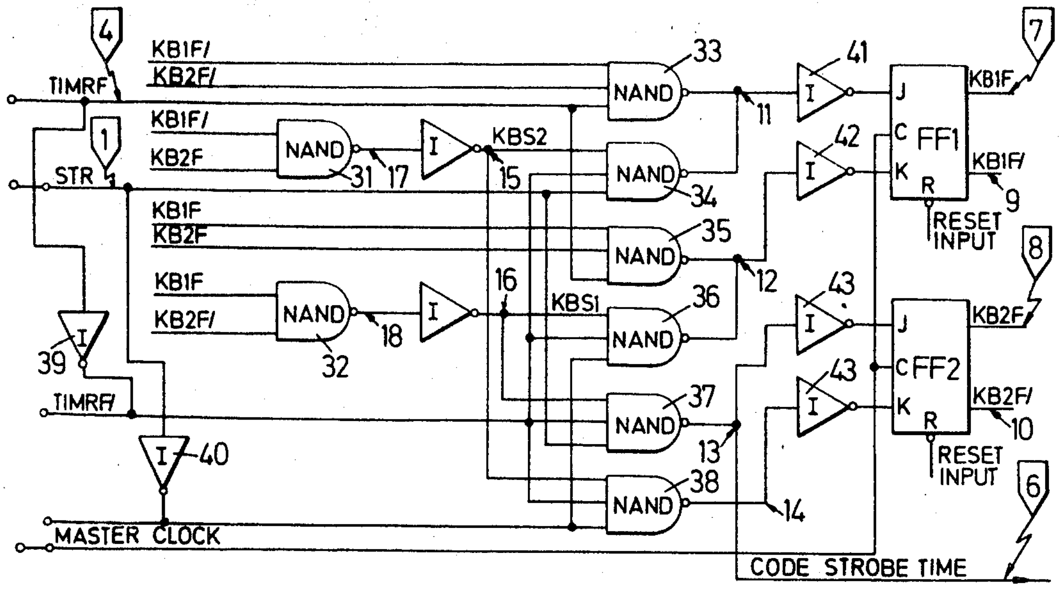
FIG. 4 is a schematic diagram of the keyboard state loop.

A possible embodiment of the four machine state loop 25 has been shown in the circuit diagram of FIG. 4.

A NAND gate 33 receives as inputs the KB1F/, KB2F/ and TIMRF signals. A NAND gate 31 receives as inputs the KB1F/ and KB2F signals and the output thereof is coupled by line 17 to an inverter the output of which, the KBS2 signal, is applied to a NAND gate 34 which also has as inputs the STR and TIMRF/ signals.

A NAND gate 35 receives as inputs the TIMRF, KB1F and KB2F signals. A NAND gate 32 receives as inputs the KB1F and KB2F/ signals and the output thereof is coupled on a line 18 to an inverter the output of which, the KBS1 signal, is applied as one input to a NAND gate 36 which also has as inputs the TIMRF/ and STR/ signals.

A NAND gate 37 receives as inputs the KBS1, TIMRF/ and STR signals, while a NAND gate 38 receives as inputs the KBS2, TIMRF/ and STR/ signals.

The combined outputs of NAND gates 33 and 34 on line 11 are applied to an inverter 41 the output of which is coupled to the J input of a J-K flip-flop FF1.

The combined outputs of NAND gates 35 and 36 on line 12 are coupled through an inverter 42 to the K input of flip-flop FF1. Said flip-flop FF1 also receives at the C input thereof the master clock signal. Flip-flop FF1 outputs are the KB1F and KB1F/ signals.

The output of NAND gate 37 is applied through an inverter 43 to the J input of a second J-K flip-flop FF2. The output of NAND gate 38 on line 14 is applied through an inverter 44 to the K input of flip-flop FF2. Said flip-flop FF2 also receives at the C input thereof the master clock signal. Flip-flop FF2 outputs are the KB2F and KB2F/ signals.

The TIMRF/ signal is obtained from the TIMRF signal through an inverter 39, while the STR/ signal is obtained from the STR signal through an inverter 40. The code strobe time signal is obtained on line 13 at the output of NAND gate 37.

Figure 3:
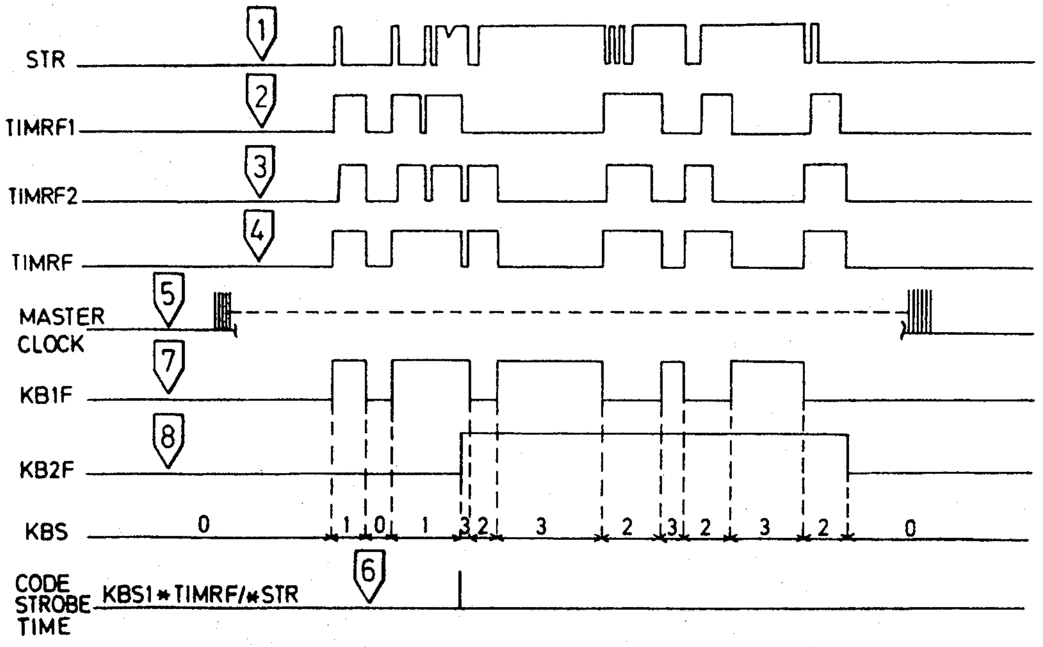
FIG. 3 is a timing diagram corresponding to a given strobe signal.

FIG. 3 shows a timing diagram for the operation of the four machine state loop 25. The waveforms shown in FIG. 3 have been picked up at test points in FIGS. 1 and 4 which are shown by framed reference numerals.

From the above description it will be recognized that a keyboard strobe system for a static keyboard has been provided which strobes the generated code only once for a single key depression whatever the number of contact bounces or overshoots affecting a static strobe signal. The strobe pulse for each SPST keyboard contact closure is clock-synchronized.

Many uses may be found for such a system and the illustrative embodiment is not considered as restrictive. Consequently, many changes may be brought in the elements and components comprising this disclosure without departing from the scope of this invention which is only confined by the scope of the following claims.

We claim:

1. A digital signal processing circuit capable of producing a single clock-synchronized strobe pulse in response to an input signal from a SPST contact, said processing circuit comprising a first retriggerable delay multivibrator with an input and an output, the input of said first retriggerable delay multivibrator receiving the positive transition of the strobe signal from the keyboard contact; a second retriggerable delay multivibrator with an input and an output, the input of said second retriggerable delay multivibrator receiving the negative transition of the strobe signal from the keyboard contact; an OR gate with two inputs and an output, said OR gate inputs receiving respectively the outputs from the first and second retriggerable delay multivibrators; a four machine state loop having three inputs and an output, a first input of said loop receiving the output from said OR gate, a second input of said loop receiving the strobe signal directly from the SPST contact and a third input of said loop receiving a master clock signal, said four machine state loop producing at the output thereof a code strobe time pulse.

2. The processing circuit as set forth in claim 1, wherein the four machine state loop comprises two J-K flip-flops, to code said loop, said J-K flip-flops receiving at the C input thereof the master clock signal.

3. The processing circuit as set forth in claim 1, wherein said first and second retriggerable delay multivibrators are so adjusted that the period thereof covers the minimum acceptable strobe signal duration.

4. The processing circuit as set forth in claim 1, wherein said SPST contact is part of a static keyboard.

* * * * *